Jan. 19, 1926.

A. R. KEARNEY ET AL 1,570,380

CHAIN BELT

Filed Feb. 27, 1923    2 Sheets—Sheet 1

Inventors
A. R. Kearney
C. W. Taylor
T. G. Leith
By Marks & Clerk
Attys.

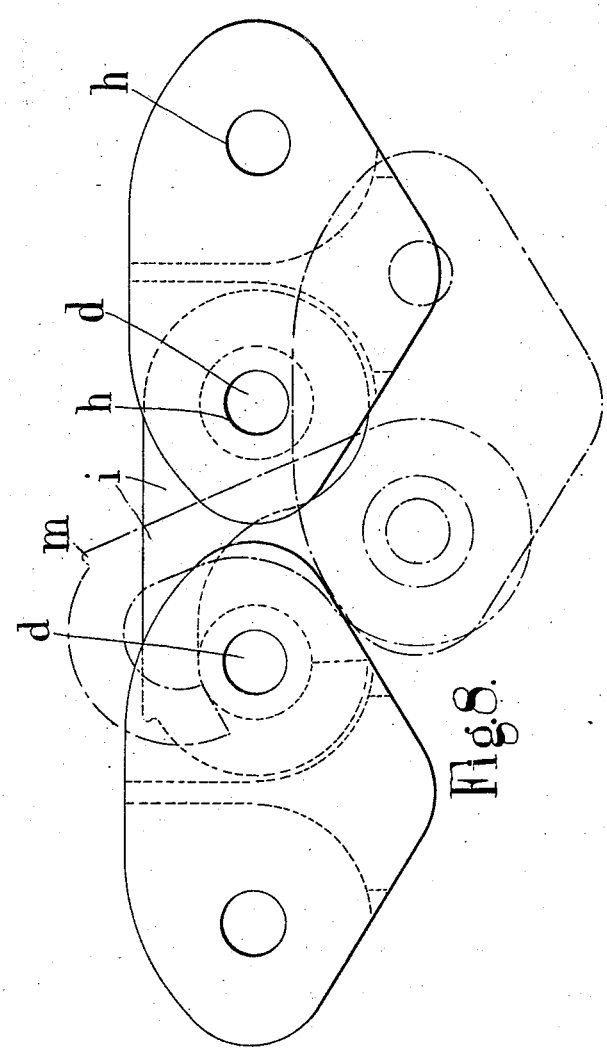

Patented Jan. 19, 1926.

1,570,380

UNITED STATES PATENT OFFICE.

ARTHUR RICHIE KEARNEY, OF GOLDERS GREEN, AND CHARLES WILLIAM TAYLOR, OF LONDON, ENGLAND, AND THOMAS GEOFFREY LEITH, OF OYNE, SCOTLAND.

CHAIN BELT.

Application filed February 27, 1923. Serial No. 621,639.

*To all whom it may concern:*

Be it known that we, ARTHUR RICHIE KEARNEY, a subject of the King of Great Britain and Ireland, and residing at 6 Templars Avenue, Golders Green, in the county of Middlesex, England, CHARLES WILLIAM TAYLOR, a subject of the King of Great Britain and Ireland, and residing at 142 Albany Street, London, N. W., England, and THOMAS GEOFFREY LEITH, a subject of the King of Great Britain and Ireland, and residing at Petmathen, Oyne, Aberdeenshire, Scotland, have invented certain new and useful Improvements in Chain Belts, of which the following is a specification.

This invention relates to improvements in chain belts and the like of the kind in which the driving links alternate with connecting or coupling links and consist of a metal frame supporting the actual rubber or other driving face; in such chain belts the connecting or coupling links are very commonly of the hooked type.

The chief difficulty met with in practice in such chain belts is to attach the rubber or the like to the frame securely enough to enable it to stand up to its work and not to be torn away under the heavy working stresses to which it is subjected.

Another difficulty when hooked links are used arises from the fact that the restraint is in some cases so incomplete that the links may come apart when handled in the workshop or elsewhere.

With the object of overcoming such difficulties, the present invention consists in the features hereinafter described and particularly set forth in the claims.

Referring to the accompanying drawings, which illustrate one form of the invention as applied to a chain or link-belt:—

Figure 8 shows adjacent links in the correct position for coupling or uncoupling in accordance with the present invention.

Figure 1:
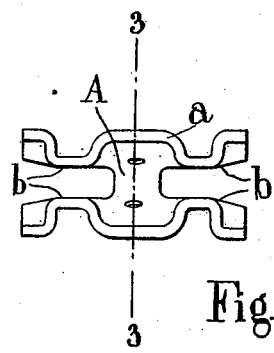
Figure 1 shows a plan of the steel skeleton of a driving link.
Figure 2:
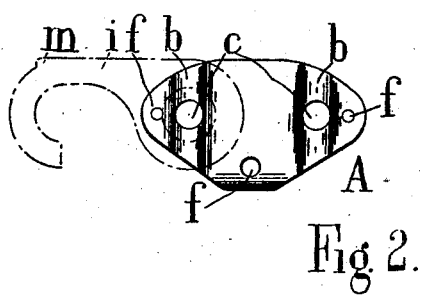
Figure 2 is a corresponding side view with a coupling link shown in dotted lines, and Figure 3 a section on the line 3—3 of Figure 1.
Figure 3:
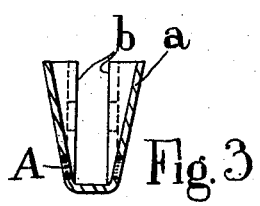
Figure 5:
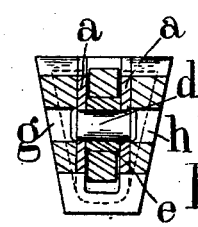
Figure 5 is a cross section on the line 5—5 of Figure 4.
Figure 6:
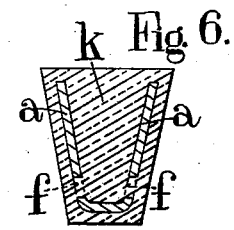
Figure 6 is a cross section on the line 6—6 of Figure 4 showing the transverse web and also the rubber passing through holes in the steel skeleton.

In carrying the invention into effect according to the form shown, each driving link consists of a steel frame or skeleton, A, as shown in Figures 1, 2 and 3. This frame may be made out of sheet steel stamped to the required form and bent into a V or U shape to correspond generally with the walls of the groove in which the belt works, the walls, $a$, of the frame, however, having stamped in them in the position shown two pairs of opposed trough-like corrugations, $b$, the inner sides of which are parallel as seen in Figure 3. In the corrugations, holes, $c$, are formed through each of which passes a riveted pin, $d$, (see Figure 5) supporting the bush, $e$, with which the coupling links co-act. Additional holes, $f$, are also formed in the steel skeleton to assist in securing the rubber thereto as shown, for example, in Figure 6.

Around the steel skeleton so formed and in particular on the inside and outside of the side walls respectively, the rubber forming the driving faces is vulcanized or moulded in an integral mass so as completely to enclose the steel frame with the exception of the opposed parallel portions of the corrugations, $b$, which project slightly beyond the rubber, sufficient space between the side walls being in every case left unfilled with rubber to permit of the insertion with sufficient clearance for easy working of the coupling links.

Owing to the shape of the skeleton and the disposition of the rubber around it a firm attachment is secured between the two parts and this attachment is assisted by the rubber passing through the holes, $f$, from side to side. Holes, $g$, $h$, (see Figure 5) may be left in the rubber so that after vulcanization the pins, *d*, and bush, *c*, of any appropriate metal may be placed in position and the ends of the pin riveted over. The bush is of such a length axially as to fit between the parallel surfaces of the corrugations, *b*, and prevent them approaching so as to jam or seize the coupling links, *i*. The opposed parallel faces of the corrugations thus serve as seatings for the metal bushes and coupling links.

According to another form, the trough-like corrugations may be annular in shape and concentric with the pivot pins, but we prefer those shown running across the link at right angles to the length of the chain as better adapted to withstand the forces tending to separate the rubber from its supporting frame.

Figure 4:
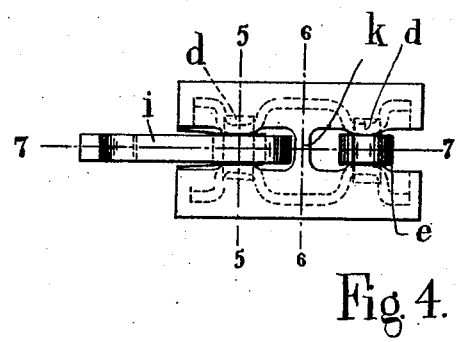
Figure 4 shows a plan of the complete driving link with the rubber vulcanized and moulded to the steel skeleton, one coupling link being shown in position.
Figure 7:
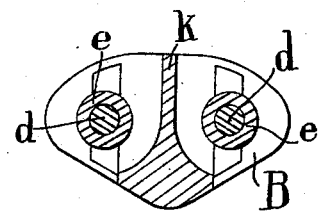
Figure 7 is a longitudinal section on the line 7—7 of Figure 4 with the coupling link removed, while finally

In order to prevent accidental detachment of a hooked link, a transverse web of rubber, *k*, is provided within the angle of the U as shown particularly in Figure 4 and also in the longitudinal section of Figure 7, the relative contours of web and hook being such that coupling or uncoupling can only be effected by a bodily distortion or local compression of the rubber or the like of the web.

Preferably the webs, when the coupling links are in place, are under a slight degree of compression, the invention being applicable to the case of a coupling linked hooked either in one or at both ends.

The web is not necessarily made integral with the body of the link and may be of any other resilient material instead of rubber; moreover, its sectional contour may be varied in any manner to give the effect desired, as for example, by broadening it at the opening of the U. Similarly, the metal frame may be of U, O or any other integral or built-up section or form.

Owing to the co-action of the web with the connecting links, special means are provided according to a further part of this invention for facilitating disconnection of one link from another. With this object the driving links are given the contour shown in Figure 8, so that by a moment parallel to itself the link on the right-hand side in the figure can be brought into the position shown by dotted lines. To effect this operation the driving link may be swung parallel to itself about the centre of the hook through a certain arc and then pushed upward and to the left, as seen in the figure, thereby distorting the rubber web, which assists in bringing the coupling link into the dotted position. At a certain stage in the movement, the small projection, *m*, with which the coupling link is provided extends beyond the contour of the driving link and the coupling link can with its help be readily lifted from its bearing.

The proportions and contour of the rubber of the driving link are preferably such that when connecting one link to another the hooked portion of the coupling link snaps over its corresponding bush, sufficient pressure being exerted in the position shown to compress slightly the rubber of which they are composed.

It is a particular feature of the contour and arrangement of the links shown that coupling and uncoupling can be effected with a much less amount of slack in the chain belt itself than in other forms of chain belt heretofore proposed.

Although the invention has been described in detail with reference to a chain-belt suitable for a motor cycle or auxiliary drives on motor cars, nevertheless the principles involved can be readily applied to conveyor or other forms of chain-belt and we wish it to be understood that the scope of the invention is wide enough to include all such applications.

In addition, our invention is not restricted to the form of metal frame illustrated as it is equally applicable to frames having side walls and of other sections or shapes, built-up or integral, while other forms of coupling link may likewise be used.

Having now described our invention, what we claim as new and desire to secure by Letters Patent is:—

1. A driving link for a chain-belt comprising in combination a substantially U-shaped metal frame having two side walls and a mass of resilient material integrally attached between and outside said walls, as set forth.

2. A driving link for a chain-belt comprising in combination a substantially U-shaped metal frame having side walls pierced with holes and a mass of resilient material integrally attached between and outside said walls, the said holes allowing the resilient material on the two sides of said walls to integrally unite, as set forth.

3. A driving link for a chain-belt comprising a metal frame having side walls, projections oppositely disposed in pairs upon the inside of said walls, and a mass of resilient material integrally attached between and outside said walls, said projections being left free from resilient material so as to provide seatings for coupling links, as set forth.

4. A driving link for a chain-belt comprising coupling links, a metal frame having side walls, projections oppositely disposed in pairs upon the inside of said side walls, parallel faces provided upon said projections to form seating for said coupling links and a mass of resilient material integrally attached to the whole inside and outside surface of the frame with the exception of said parallel faces, as set forth.

5. A driving link for a chain-belt comprising a metal frame having side walls, corrugations upon the surface of said side walls and a mass of resilient material integrally attached between and outside said walls, as set forth.

6. A driving chain-belt comprising in combination coupling links, driving links composed of a substantially U-shaped metal frame, a mass of resilient material integrally attached to the inside and outside of said frame, and means for connecting said links together, as set forth.

7. A chain belt comprising in combination a driving link having a metal frame, a coupling link having a hook at one end for connecting said hook to said driving link, and a mass of resilient material integrally attached within and around said frame so as to leave a space for said hook, a coupling link being adapted to be engaged or disengaged in position only when said driving link has been brought to touch the next adjacent driving link by a movement parallel to itself as set forth.

8. A driving chain belt comprising in combination a driving link having a metal frame, a coupling link pivotally attached to one end to a driving link, a hook at the other end of said coupling link, a resilient mass of material integrally attached within and around said metal frame leaving a free space for the hooked end of said coupling link, means on said metal frame for engaging said hooked end and a projection on said hooked end for leaving the latter out of engagement with the driving link as set forth.

In testimony whereof we have signed our names to this specification.

ARTHUR RICHIE KEARNEY.
CHARLES WILLIAM TAYLOR.
THOMAS GEOFFREY LEITH.